United States Patent
Munger (10) Patent No.: US 11,636,424 B1
(45) Date of Patent: Apr. 25, 2023

(54) SYSTEM AND METHOD TO DETECT FAILURES AT A SUBSET OF LOAD CELLS

(71) Applicant: AMAZON TECHNOLOGIES, INC., Seattle, WA (US)

(72) Inventor: Paul Eugene Munger, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 301 days.

(21) Appl. No.: 16/747,183

(22) Filed: Jan. 20, 2020

Related U.S. Application Data (63) Continuation of application No. 15/380,951, filed on Dec. 15, 2016, now Pat. No. 10,540,631.

(51) Int. Cl.
*G06Q 10/08* (2012.01)
*G06Q 10/087* (2023.01)
*G06Q 20/00* (2012.01)

(52) U.S. Cl.
CPC .......... *G06Q 10/087* (2013.01); *G06Q 20/00* (2013.01)

(58) Field of Classification Search
CPC .............. G06F 3/0613; G06F 11/3476; G06Q 10/0633; G06Q 40/00; G06Q 90/20; G06Q 10/087; G07G 1/0072; G07G 1/12; G07G 1/0009
USPC .......... 705/14.64, 23, 28, 323; 235/382, 375
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2 | 1/2014 | Groenevelt et al. |
| 9,235,928 B2 | 1/2016 | Medioni et al. |
| 9,473,747 B2 | 10/2016 | Kobres et al. |
| 10,614,414 B1 * | 4/2020 | Raymond .......... G06Q 10/0633 |
| 2007/0050271 A1 * | 3/2007 | Ufford ................. G06Q 10/087 705/28 |
| 2011/0011936 A1 | 1/2011 | Morandi et al. |

(Continued)

OTHER PUBLICATIONS

Asthana, et al., "An Indoor Wireless System for Personalized Shopping Assistance", CiteSeerX, In Proceedings of IEEE Workshop on Mobile Computing Systems and Applications, 1994, 6 pages. Retrieved from the Internet: http://citeseerx.ist.psu.edu/viewdoc/summary?doi=10.1.1.127.3303.

(Continued)

*Primary Examiner* — Olusegun Goyea
(74) *Attorney, Agent, or Firm* — Lindauer Law, PLLC

(57) ABSTRACT

Load cells are used in a fixture of a facility to acquire weight data. However, some of the load cells used in the fixture may fail. One way to test a subset of load cells is to compare data from a first subset of load cells to a second subset of load cells using a linear regression. For example, the linear regression may help determine predicted values for the first subset of load cells. Actual values from the first subset of load cells are then compared to the predicted values. If the differences between the actual values and predicted values for the first subset of load cells are greater than a threshold, a determination is made that the first subset of load cells has failed. Weight data from the second subset of load cells may then be used to determine hypotheses for describing interactions at the fixture.

20 Claims, 5 Drawing Sheets

(56) References Cited

U.S. PATENT DOCUMENTS

| | | | |
|---|---|---|---|
| 2012/0284132 A1 | 11/2012 | Kim et al. | |
| 2013/0223673 A1* | 8/2013 | Davis | G06Q 20/208 235/375 |
| 2013/0284806 A1* | 10/2013 | Margalit | G07G 1/0009 235/382 |
| 2013/0290106 A1* | 10/2013 | Bradley | G06Q 90/20 705/323 |
| 2014/0052555 A1* | 2/2014 | MacIntosh | G07G 1/12 705/23 |
| 2014/0074762 A1* | 3/2014 | Campbell | G06Q 40/00 706/46 |
| 2014/0379296 A1* | 12/2014 | Nathan | G06V 10/811 702/150 |
| 2015/0086107 A1 | 3/2015 | Dedeoglu et al. | |
| 2015/0310601 A1* | 10/2015 | Rodriguez | G07G 1/0072 348/150 |
| 2021/0271413 A1* | 9/2021 | Herzogenrath | G06F 3/0613 |

OTHER PUBLICATIONS

Goyea, Olusegun, "Final Office Action dated May 31, 2019", U.S. Appl. No. 15/380,951, The United States Patent and Trademark Office, dated May 31, 2019.

Goyea, Olusegun, "Non-final Office Action dated Nov. 19, 2018", U.S. Appl. No. 15/380,951, The United States Patent and Trademark Office, dated Nov. 19, 2018.

Goyea, Olusegun, "Notice of Allowance dated Aug. 30, 2019", U.S. Appl. No. 15/380,951, The United States Patent and Trademark Office, dated Aug. 30, 2019.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_super markets.

Pop, Cristian, "Introduction to the BodyCom Technology" AN1391, DS01391A, Microchip Technology, Inc., May 2, 2011, 26 pages. Retrieved from the Internet: http://www.microchip.com//wwwAppNotes/AppNotes.aspx?appnote=en555156.

Vu, et al., "Distinguishing Users with Capacitive Touch Communication", WINLAB, Rutgers University, In proceedings of: The 18th Annual International Conference on Mobile Computing and Networking ('MobiCom '12), Istanbul, Turkey, Aug. 22-26, 2012, 12 pages.

* cited by examiner

SYSTEM AND METHOD TO DETECT FAILURES AT A SUBSET OF LOAD CELLS

PRIORITY

This application is a continuation of, and claims priority to, U.S. patent application Ser. No. 15/380,951, filed on Dec. 15, 2016, entitled "System To Determine Load Cell Failure", which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility (facility) or other setting may utilize fixtures, such as shelves, that are equipped with load cells or other weight sensing devices. Weight data generated by these load cells may be used to determine interactions with items stowed or otherwise held by those fixtures. The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using data from sensors, such as the load cells, to determine interactions in the facility. Interactions may comprise the user picking an item from a fixture, placing an item at a fixture, touching an item, bringing an object such as a hand or face close to an item, and so forth. For example, the inventory management system may generate interaction data that indicates what item a user picked from a particular fixture, and then use this interaction data to adjust the count of inventory stowed at the particular fixture.

The load cells may be arranged to gather information about the changes in weight occurring at a fixture. For example, the fixture may comprise a rectangular shelf with load cells arranged at or near each end of the shelf, at or near each of the four corners, or in other configurations.

The weight data may be used to determine data such as a quantity of items that have been picked from or placed to a fixture, to determine the identity of a type of item that has been picked from or placed to the fixture, and so forth. Use of load cells and the weight data offers several operational benefits, especially in a materials handling facility or other facility. These benefits may include mechanical robustness, relatively low cost for installation and maintenance, fast response times, and so forth.

However, even robust devices occasionally fail. An incorrect reading from one of the load cells could result in erroneous data being provided to the inventory management system. As a result of this erroneous data, the inventory management system may make incorrect determinations. For example, a failure of a load cell that results in weight data indicative of zero load could result in interaction data being incorrectly generated that a user picked an item from the shelf when they have not.

Failures in load cells may be intermittent. For example, a loose connection may result in the load cell working sometimes, and not working at others. As a result, the inventory management system may be provided with incorrect data that in turn generates incorrect output.

Described in this disclosure are techniques to analyze the data from the load cells on a particular fixture to determine if that data is somewhat consistent. Each load cell provides a channel of weight data. For example, a shelf may have four load cells, each producing a separate channel of weight data, or channel data. Continuing the example, weight data from three channels is analyzed and compared to a fourth channel. If the deviation between these two exceeds a threshold value, the output from that fourth channel may be deemed invalid, and the load cell associated with the fourth channel may be disregarded. In this way, the load cells are used to check one another.

Analysis of the weight data begins with determining a change in the values of the weight data that is possibly indicative of an event. For example, an event detector may analyze the weight data and determine that some change has taken place at one or more of the load cells.

The weight values in the weight data obtained from the load cells during the event may be filtered to produce filtered data. For example, a Gaussian filter may be applied to the weight data to produce filtered data. In some implementations, the filtered data may include low frequency data, with higher frequency data removed by the filter.

Vibrations in the fixture take some time to propagate across the fixture. To account for phase shifts resulting from these vibrations, weight values in the filtered weight data that have been obtained at different times may be used. For example, time shifted weight values for t−1, t−2, t, t+1, and t+2 may be used.

A linear regression may be used to compare the weight values of the channel under test with the time shifted weight data from the remaining channels. For example, a linear regression may be used to determine a least squares best fit of the channel being tested to the remaining channels. In this fashion, data from the channel being tested is assessed to see if it is consistent with the data from the remaining channels.

In some implementations, the linear regression may utilize a ridge regression that minimizes issues associated with overfitting. The ridge regression incorporates a slack parameter that allows small deviations in the weight values to be disregarded.

The linear regression process produces as output regression data. In one implementation, the regression data may comprise a value of the least squares best fit. This may be expressed as a value given a particular input, as an equation, and so forth. With this implementation, the linear regression provides a model in which the weight values from the remaining channels are used to predict the weight value from the channel being tested. For example, the regression data may comprise an equation or parameters for an equation that specify a line that best fits the weight values from the remaining channels. The difference between the actual value of the channel being tested and the predicted value may be known as a residual. In one implementation, the best fit with respect to the least-squares minimizes the sum of squared residuals. In one example, if the weight values are represented on a graph with the X axis indicating the weight values from the remaining channels and the Y axis indicating the weight value from the channel being tested, a straight line is fit through these points such that overall the residual differences are minimized. The regression data may be analyzed to determine if one or more values exceed a threshold that is indicative of an error. For example, if the regression data indicates that the weight values of the channel under test do not fit within a threshold value of the weight values indicated by the regression data, fault data may be generated. The fault data may provide information about the particular load cell that produced the fault, information about the type of fault, and so forth. The fault data may then be used for subsequent mitigation of the fault in the load cell. For example, weight data from the load cell that is indicated by the fault data may be disregarded, the faulting load cell may be deactivated, a work order may be generated to replace the load cell, and so forth.

By using the devices and techniques described herein, operation of the facility may be improved. Failures of the load cells that provide data to the inventory management system may be quickly detected, and mitigation actions taken. By determining a fault in a load cell, the inventory management system is able to disregard erroneous data and avoid generating output based on faulty data. As a result, the inventory management system may be able to quickly track what item a user has interacted with, maintain up-to-date item data, and so forth, even when load cells exhibit failures.

Illustrative System

Figure 1:
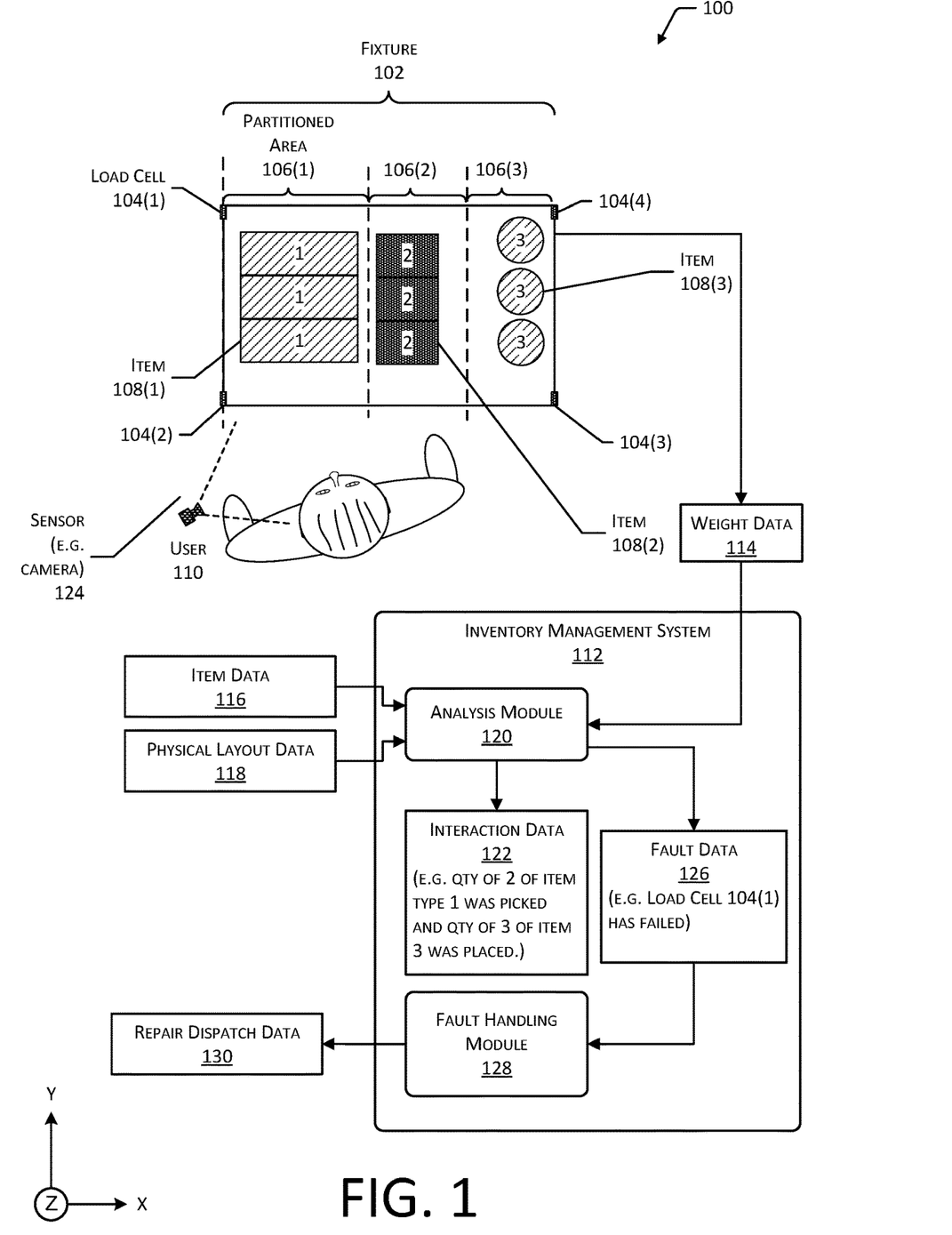
FIG. 1 illustrates a system that uses load cells to determine interaction data about the pick (removal) or place (return or loading) of items stowed on a fixture and assesses the load cells for failures, according to some implementations.

FIG. 1 illustrates a system 100 that uses load cells to determine interaction data about a fixture, such as a shelf, according to some implementations. A fixture 102, such as a shelf, is equipped with a plurality of load cells 104. Each load cell 104 is configured to generate information indicative of a weight applied thereto. For example, the load cell 104 may comprise a weight sensor that supports at least a portion of the fixture 102. The load cells 104 are described in more detail below. As depicted here, the fixture 102 is measured using four load cells 104(1), 104(2), 104(3), and 104(4). Each load cell 104 is located at the four corners of the rectangular fixture 102. For example, the load cell 104(1) is located at or near a rear left corner, the load cell 104(2) is located at or near a front left corner, the load cell 104(3) is located at or near a front right corner, and the load cell 104(4) is located at or near a rear right corner. In other implementations, other arrangements of load cells 104 may be utilized. The techniques described herein may be used with regard to other types of fixtures 102, such as racks, hangers, bins, and so forth.

The fixture 102 may be divided into one or more partitioned areas 106. The partitioned areas 106 are areas upon the fixture 102 that is associated with a particular type of item 108. For example, the fixture 102 depicted here has three partitioned areas 106(1), 106(2), and 106(3). Partitioned area 106(1) may be associated with storing some quantity of item 108(1) such as cat food, while partitioned area 106(2) may be associated with storing some quantity of item 108(2) such as dog food, and partitioned area 106(3) may be associated with storing some quantity of item 108(3) such as fish food.

A user 110 may interact with the fixture 102 or the partitioned areas 106 at the fixture 102. For example, the user 110 may remove item 108(1) from the partitioned area 106(1). The user 110 may then return the item 108(1) to the fixture 102. Several users 110 may interact with the same fixture 102 in quick succession.

An inventory management system 112 may be configured, as described below, to perform various functions with regard to a facility. To perform these functions, the inventory management system 112 may accept weight data 114 indicative of the weight as measured by the load cells 104. For example, the load cells 104 may send weight signals to a computing device of the fixture 102 that then generates the weight data 114, which includes weight values and timestamps indicative of when those weight values were obtained. In some implementations, the computing device of the fixture 102 may provide various functions, such as filtering or otherwise conditioning the weight signals, generating and transmitting the weight data 114, and so forth.

The inventory management system 112 may maintain and utilize item data 116 and physical layout data 118. The item data 116 comprises information about a particular type of item 108. The item data 116 may include information indicative of a weight of a single item 108, or a package, kit, or another grouping considered to be a single item 108. The item data 116 may include other characteristics of that type of item 108 such as: physical dimensions, characteristics about how the item 108 appears, and so forth. For example, the item data 116 may comprise a plurality of local descriptor values generated by feature extraction algorithms, parameters for classifiers, neural network configuration data, and so forth, that characterizes the appearance of a representative one or more of the items 108. The item data 116 may indicate the types and quantities of items 108 that are expected to be stored at that particular fixture such as in a particular lane on a fixture 102. The item data 116 may include other data. For example, the other data may comprise weight distribution of the item 108, point cloud data for the item 108, and so forth.

The physical layout data 118 may provide information indicative of where fixtures 102 are in the facility, location of sensors, information about sensor orientation and field of view (where applicable), and so forth. For example, the physical layout data 118 may comprise information representative of a map or floor plan of the facility with relative positions of fixtures 102, planogram data indicative of how types of items 108 are to be arranged at the fixtures 102, and so forth. In another example, the physical layout data 118 may comprise information indicating the particular placement of load cells 104 on a particular fixture 102.

The inventory management system 112 may include or have access to an analysis module 120. During operation, the analysis module 120 may access one or more of the weight data 114, the item data 116, the physical layout data 118, or other data to generate interaction data 122. For example, the facility may include other sensors 124, such as cameras having a field of view that includes at least a portion of the fixture 102 or another fixture. The sensors 124 generate sensor data, such as image data from the camera. The interaction data 122 provides information about an interaction, such as a pick of an item 108 from the fixture 102, a place of an item 108 to the fixture 102, a touch made to an item 108 at the fixture 102, a gesture associated with an item 108 at the fixture 102, and so forth. The interaction data 122 may include one or more of the type of interaction, interaction location identifier indicative of the fixture 102 at which the interaction took place, an item identifier indicative of a type of item 108 or a particular item 108, quantity change to the item 108, user identifier, and so forth. The interaction data 122 may then be used to further update the item data 116. For example, the quantity of items 108 on hand at a particular partitioned area 106 on the fixture 102 may be changed based on an interaction that picks or places one or more items 108. Operation of the analysis module 120, including generation of the interaction data 122, is discussed in more detail below.

In order to provide interaction data 122 with the best accuracy, the analysis module 120 should be provided with weight data 114 that is not faulty. Load cells 104 and their associated circuitry and wiring may experience occasional failures. For example, a load cell 104 may stop functioning, may operate erratically, and so forth.

The analysis module 120 may be configured to assess the weight data 114 prior to processing to determine interaction data 122, and generate fault data 126 if a load cell 104 is deemed to be faulty. The fixture 102 includes a plurality of load cells 104 which are part of a common mechanical system. As a result, there are physical constraints placed on the fixture 102 and the load cells 104. For example, the material of the fixture 102 that connects the load cells 104 is not completely rigid, and imposes a physical constraint. Continuing the example, if an item 108 is resting on the fixture 102, each of the load cells 104 should report a non-zero weight.

The analysis module 120 may be configured to process the weight data 114 and generate the fault data 126 by looking for data indicative of a disagreement between the weight values in the weight data 114. For example, the weight data 114 comprises several channels of weight data 114, each channel originating at a different load cell 104. The analysis module 120 compares data from one channel with the data from the other channels. The data may be obtained from mutually exclusive subsets of the load cells 104. For example, weight values in channel one that originate from a first subset that comprises load cell 104(1) and is then compared to the weight values from channels two through four that originate from a second subset that comprises load cells 104(2)-104(4), respectively. The load cells 104 in the first subset and the second subset may be mutually exclusive. At any given time, multiple comparisons may be made. For example, while load cell 104(1) is being tested against data from load cells 104(2)-(4), the system may test load cell 104(2) against the other three load cells 104(1), 104(3), and 104(4). Details of this analysis are described in more detail below with regard to FIG. 2.

The analysis module 120, or other modules, may perform event detection to determine if an event has taken place at the fixture 102. Events may include a pick or place of an item 108. One or more change detection algorithms may be used to identify when the weight values have changed in such a way as to meet or exceed a threshold value. For example, the event may be determined using a cumulative sum (CUSUM) function. An event may include weight data 114 that begins at a start time and continues through an end time.

Testing by the analysis module 120 for faulty load cells 104 may be performed with the weight data 114 associated with an event, or may be performed selectively such as on the occurrence of a particular event, schedule, and so forth. For example, each time an event is detected in the weight data 114, the weight data 114 may then be processed to determine if a fault is present before subsequent processing to determine interaction data 122. In this implementation, overall system resources are conserved by avoiding more resource-intensive processing of otherwise faulty weight data 114 to determine which item 108 was picked or placed from which partitioned area 106.

The analysis module 120 may provide the fault data 126 to a fault handling module 128. The fault handling module 128 may initiate one or more mitigating actions. For example, with the failure of a load cell 104(1) at the fixture 102(1), the weight data 114 from the fixture 102(1) may be subsequently disregarded as being unreliable. The analysis module 120 may be directed to ignore the weight data 114 and use other sensor data, such as from cameras, to determine the interaction data 122. Another mitigation action may be the generation of repair dispatch data 130. For example, the fault handling module 128 may generate repair dispatch data 130 that is indicative of the particular load cell 104 and the location with the facility. A repair technician, robot, or other agency may be used to repair or replace the faulty load cell 104.

By using these techniques, a faulty load cell 104 is prevented from introducing erroneous data for further processing that could otherwise result in incorrect interaction data 122 being generated. Additionally, because faults are quickly determined, they may be more quickly and easily repaired.

Figure 2:
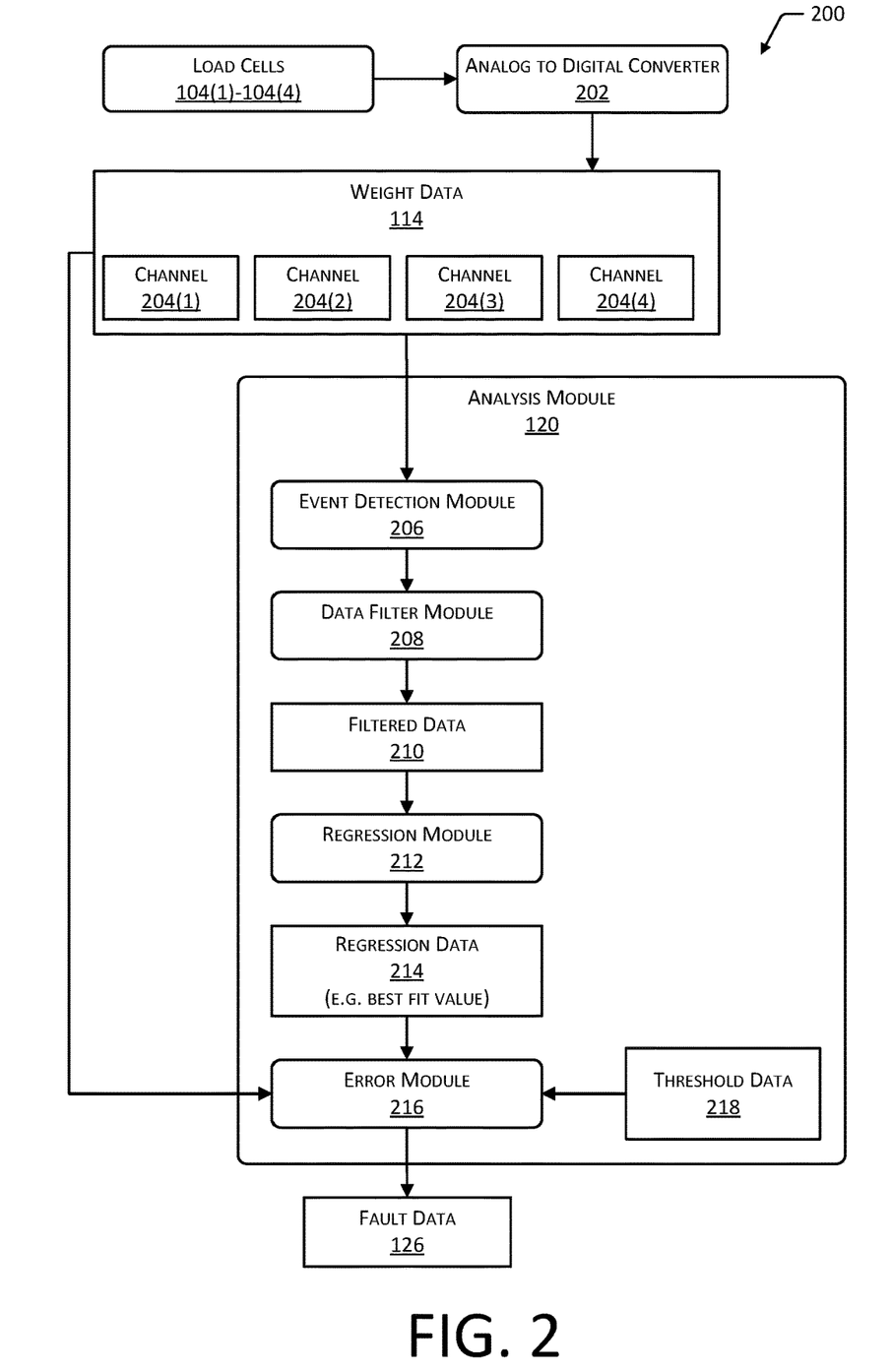
FIG. 2 is a block diagram of processing weight signals from load cells to determine fault data, according to some implementations.

FIG. 2 is a block diagram 200 of processing weight signals from load cells 104 to determine fault data 126, according to some implementations. The load cells 104 may generate weight signals indicative of a weight on the load cell 104. These weight signals are converted into the weight data 114. For example, analog output from the load cell 104 may be converted into digitized data using an analog to digital converter (ADC) 202. In one implementation, the sample rate of the ADC 202 may be 120 samples per second. The weight data 114 may comprise digitized data that is representative of separate channels, each channel associated with a particular load cell 104. For example, the weight data 114 may include the weight values of the first load cell 104(1) in the first channel data 204(1), the weight values of the second load cell 104(2) in the second channel data 204(2), and so forth.

The fixture 102 provides a known mechanical system, which constrains the possible outputs from the load cells 104 during normal operation of those load cells 104. For example, the fixture 102 may comprise a shelf that is supported by a base, with the load cells 104 arranged between the shelf and the base. In this configuration, the load cells 104 provide information about the weight on the shelf. The load cells 104 may act like very rigid springs. If the surface of the shelf were to be perfectly rigid and flat, the displacements of these load cells 104(1)-(4) would satisfy Expression 1 below:

$$x_1 + x_3 = x_2 + x_4 \quad \text{EXPRESSION 1}$$

In Expression 1 $x_i$ indicates the displacements of the corners of the shelf, the corners designated starting at the top left corner and moving counterclockwise around the perimeter of the shelf. In the situation where a load cell 104 is arranged at each of the four corners of the shelf, the following Expression 2 should always sum to zero, where w is a weight value at location x where a load cell 104 is positioned.

$$m = w_1 - w_2 + w_3 - w_4 \quad \text{EXPRESSION 2}$$

However, physical objects such as the shelf are not perfectly rigid, and they do exhibit some deflection. For example, the shelf may be no more rigid than the spring equivalents of the load cells 104. As a result, the magnitude of the deflections of the shelf may be of the same order as those of the load cells 104. Given this ability to flex, a large impulse as applied to the shelf may produce a similarly large response in m. This large response may render m as unusable for the direct determination as to whether there is a mechanical consistency in the weight values at a given time $w_i(t)$.

However, even though the fixture 102 exhibits some deflection, it still enforces a particular dynamic relationship between the load cells 104. For example, the shelf itself limits how the load cells 104 may move, with its stiffness acting against any deflection caused by a change in $x_i$ and the corresponding force on the load cells 104.

The presence of multiple load cells 104 as constrained by a common physical structure, such as the shelf of the fixture 102 may be used as follows to determine if a load cell 104 has failed.

In some implementations, the assessment of the load cells 104 for faults may be responsive to the occurrence of an event. The analysis module 120 may include an event detection module 206. The event detection module 206 may be configured to determine if an event has taken place. The event may be determined by utilizing one or more change detection algorithms to identify when the weight values have changed in such a way as to meet or exceed a threshold value. For example, the event may be determined using a cumulative sum (CUSUM) function. Continuing the example, if the CUSUM function indicates that the weight values have exceeded a threshold change over time, an event may be designated.

The event, or other portion of weight data 114 being analyzed, comprises a time series $\{x(t)\}_{t=0}^{N}$ of four values, each value representing a different one of the four load cells 104 at time t. While four load cells 104(1)-(4) are depicted in FIG. 1 and described, it is understood that these techniques may be applied to fixtures 102 utilizing larger or smaller numbers of load cells 104. In some implementations, the time series may comprise data obtained over a period of time of at least 500 milliseconds. The duration of the time series may be based on a variety of factors, including the type of noise typically experienced in the system, vibration modes of the fixtures 102, and so forth.

The analysis module 120 determines the fault data 126 by providing a linear approximation for each coordinate of the time series for one channel 204 using the other three channels 204 in a way that allows for the movements of the portion of the fixture 102 that joins the load cells 104, such as a shelf which rests on the load cells 104. If any one channel 204 is poorly approximated by the other three channels 204, the inconsistency may be used to generate the fault data 126.

Load cells 104 may produce output that is noisy for a variety of reasons. For example, noise may result from internal electronic noise, physical vibrations from the ambient environment, and so forth. The weight data 114 for a channel 204 may be full of noise that presents as deviations from the idealized physical relationship described above with a system involving perfectly rigid components.

When an event has been detected, the weight data 114 associated with that event may be provided to a data filter module 208. The data filter module 208 may be used to filter the weight data 114 and reduce or eliminate the noise in the weight data 114. The data filter module 208 produces as output filtered data 210.

The filtered data 210 may comprise a time series of the weight values $w(t) = G(|x'(t)|)$, where G is a Gaussian filter and $|x|$ is the coordinate-wise absolute value. The filtered data 210 w is thus a smoothed version of an envelope of x'. The absolute value may be used because two sine waves of opposite phase may be deemed to be the same for the following analysis.

In other implementations, other filters may be used to generate the filtered data 210. For example, a low pass Butterworth filter function may be used.

The regression module 212 may perform the following operations. In the following examples, assume that a first channel 204(1) is to be approximated using the weight values for the remaining three channels 204(2)-(4). An N×15 matrix A may be defined by Expressions 3 and 4:

$$A' = [w_2 | w_3 | w_4] \quad \text{EXPRESSION 3}$$

$$A = [A' | \sigma A' | \sigma^2 A' | \sigma^{-1} A' | \sigma^{-2} A'] \quad \text{EXPRESSION 4}$$

In Expression 3, $w_i$ indicates the weight value of the $i^{th}$ channel 204 produced by the load cell 104(i). In Expression 4, σX shifts column values of X down by one row (i.e. by one unit of time). In this example, this allows for regression of $w_1$ against columns of $\underline{A}$. The shifted copies of A are included to allow for the small phase shifts caused by the flexibility of the fixture 102, such as the shelf.

The regression module 212 may proceed to determine v, which is a least squares best solution to Expression 5:

$$Av + \lambda v = w_1 \qquad \text{EXPRESSION 5}$$

A ridge regression, also known as a constrained linear inversion, may be used. Random variations between the weight values of the different channels 204 lead to a high potential for overfitting. These random variations are exacerbated by using the time shifted copies of A. The use of $\lambda$ in this expression acts as a damper to overfitting. The value of is selected to be large enough to penalize physically unlikely solutions with a very large magnitude. For example, $\lambda=128$ may be used in some implementations, but other implementations may use a $64 < \lambda < 128$ with suitable performance. The regression module 212 may provide regression data 214 that comprises output from Expression 5. In some implementations, the regression data 214 may include regression coefficients.

The regression module 212 may now use the fit Av to compute an error using Expression 6:

$$\varepsilon(x) = \|\lfloor |Av - w_1| - L \rfloor\| \qquad \text{EXPRESSION 6}$$

Expression 6 may be described as showing that E(x) is how much a tube of width L around Av misses $w_1$ in the $L^2$ sense. In one implementation, $$L = \frac{\|Av\|_\infty}{2}.$$

However, L may use a value with a similar order of magnitude. The regression data 214 may include ε as well as $\|v\|$ (the norm of v). For example, the norm may comprise the magnitude of a vector in a vector space.

The regression data 214 may be assessed by the error module 216. The error module 216 may access threshold data 218 during operation. For example, the threshold data 218 may indicate threshold values for comparison of ε and $\|v\|$.

In some implementations, when ε is greater than a threshold value, a fault may be determined. As shown in Expression 6, ε is large when $w_2$, $w_3$, $w_4$ are incapable of approximating $w_1$ even with a large tolerance. For example, when ε>1, fault data 126 may be generated indicating a failure of the load cell 204.

In some implementations, the error module 216 may determine fault data 126 indicative of a failure in a load cell 104 when the $\|v\|$ is below a threshold value. For example, the threshold value may be 0.015, in some implementations. In this situation, the best fit is to do nothing, and the process lets the entire value w be the residual. This situation may occur when one channel 204 fails to respond when the other three channels 204 generate weight data 114 indicative of an event.

The error module 216 may determine that an event contains an anomaly and generate fault data 126 indicative of failure of one or more load cells 104 based on the comparison of the regression data 214 with the threshold data 218. For example, a fault may be indicated when E is greater than a first threshold value or $\|v\|$ is less than a second threshold value. A high confidence in the determination of a failure may be deemed to occur when ε is greater than a first threshold value and $\|v\|$ is less than a second threshold value.

The following computer code illustrates one implementation of the process described here. This code is expressed using the Python language as promulgated by the Python Software Foundation. The code utilizes the NumPy package as promulgated by the NumPy developers at www.numpy.org and SciPy packages as promulgated by the SciPy developers at www.scipy.org.

CODE 1

```
import numpy as np
import scipy.ndimage as nd
import scipy.sparse.linalg
NORMALIZED_ERROR_MAX=1.0
MIN_FIT_SIZE=0.015
def event_error_score(i, j, channel, event, lamb=128.0,
    sigma=2.5, slack=0.5, sl=0.0):
    """
    Looks at relationship between channels during an event to
    see if the load cell+shelf system is broken or not. We try to
    fit event[:, channel] as a linear combination of the rest of
    event (with time shifts allowed, to account for phase shifts).
    We are interested in getting the general outline right, so we
    fit a smoothed and rectified version of the signal. Also in
    computing the error we don't count small deviations, using
    the slack parameter. This way small irrelevant deviations
    don't accumulate.
    :param i: start index of actual event
    :type i: int
    :param j: end index of actual event
    :type j: int
    :param channel: which load cell channel to check
    :type channel: int in range(4)
    :param event: the four load cell streams
    :type event: numpy matrix. event.shape=[number of
        samples, 4]
    :param lamb: regularization parameter to prevent overfit-
        ting the linear model. Higher=>less overfitting
    :type lamb: float
    :param sigma: Std of Gaussian smoothing kernel
    :type sigma: float
    :param slack: residuals smaller than slack count as zero
    :type slack: float
    :param sl: short for slack lambda. When computing
        slacked residual, how much to count the overfitting
        penalty.
    :rtype: np.array
    """
    assert(i>1) # make sure we have enough room to shift
        channels assert(len(event)-j>1)
    # operate on the derivative to avoid caring about constant
        difference
    event=np.diff(event, axis=0)
    b=event[i:j, channel]
    b-=np.average(b) # de-trend the data
    A=np.hstack((event[i:j,[k  for  k  in  range(4)  if
        k!=channel]],
        event[i+1:j+1,[k for k in range(4) if k!=channel]],
        event[i+2:j+2,[k for k in range(4) if k!=channel]],
        event[i-1:j-1,[k for k in range(4) if k!=channel]],
        event[i-2:j-2,[k for k in range(4) if k!=channel]]))
    A-=np.average(A, axis=0)
    # try to fit to the envelope instead of the actual signal since
        we only
    # care about the general outline.
    b=np.abs(b)
    b=nd.gaussian_filter1d(b, sigma)
    A=np.abs(A)
    A=nd.gaussian_filter1d(A, sigma, axis=0)
```

```
# lamb is the term that penalizes ||xfit||
xfit=scipy.sparse.linalg.lsqr(A, b, lamb)
# scipy lsqr does not return the solution itself so we
    compute it
soln=np.dot(A, xfit[0])
solnorm=np.linalg.norm(soln)
solmax=np.max(np.abs(soln))
slack=solmax*slack # slack is proportional to the size of
    the fit
res=b−soln
res=np.abs(res)
res−=slack
res=np.maximum(res, 0)
resnorm=np.linalg.norm(res)
slack_rmse=np.sqrt(resnorm*resnorm+
    sl*solnorm*sl*solnorm)
return np.array([slack_rmse, j−i, solnorm])
def is_bad(rmse, length, norm):
    # An event is bad if its approximation error is too high, or
        if our best
    # fit is to just give up and not use the other channels.
    return   (float(rmse)/float(length)>NORMALIZED_ER-
        ROR_MAX) or (norm<MIN_FIT_SIZE)
```

Additional details regarding linear regression may be found in Annette J. Dobson and Adrian G. Barnett's work "An Introduction to Generalized Linear Models", $3^{rd}$ ed., Chapman & Hall, 2008.

By using these techniques, as described above, fault data 126 may be generated that indicates one or more load cells 104 have failed. These failures may be due to warped members in the fixture 102 (such as a warped shelf), an electrical problem in the load cells 104, an overloaded fixture 102 that is carrying more weight than the load cells 104 are rated for, or other modes of failure.

Figure 3:
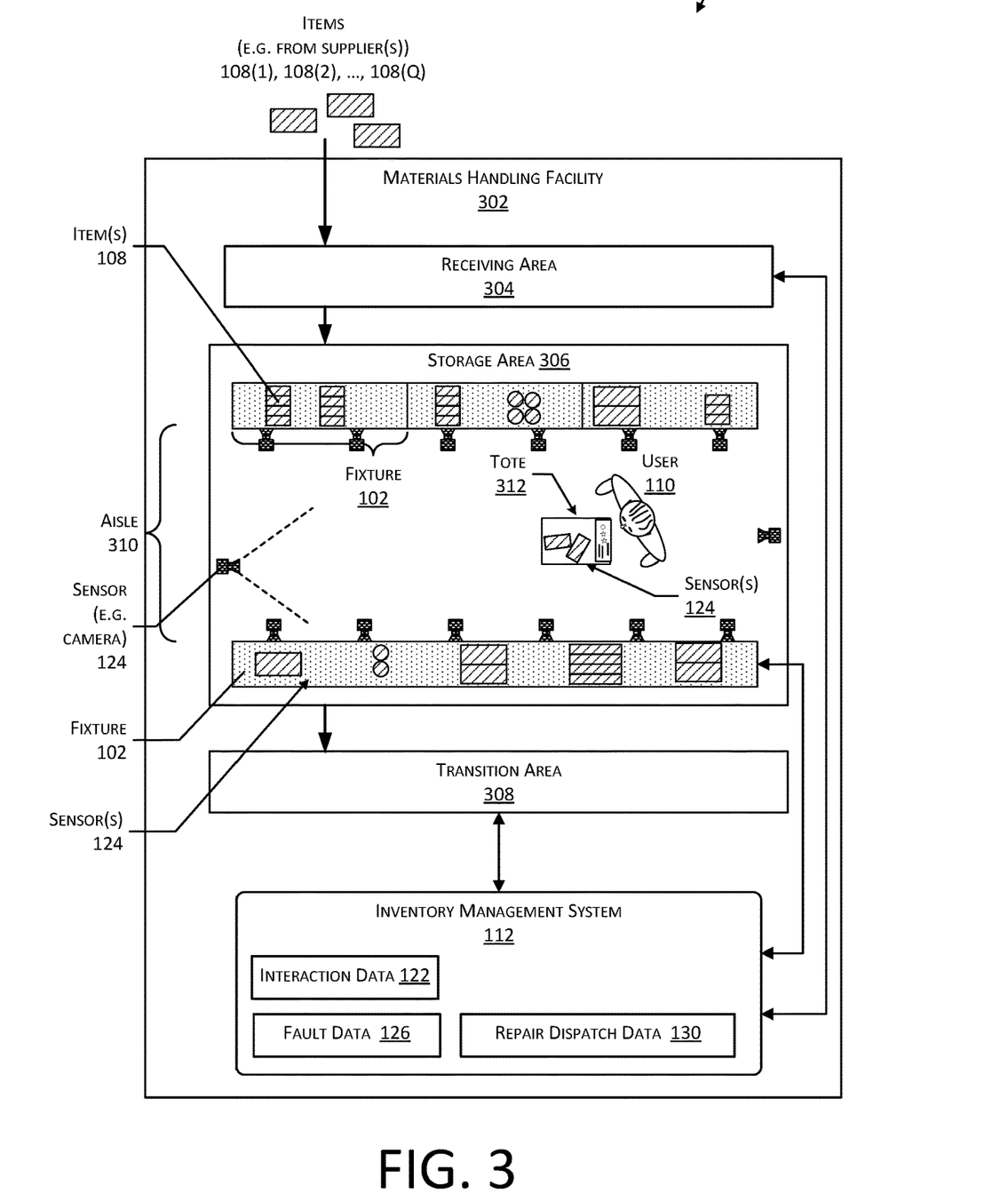
FIG. 3 is a block diagram illustrating a materials handling facility (facility) using the system, according to some implementations.

FIG. 3 is a block diagram 300 illustrating a materials handling facility (facility) 302 using the system 100, according to some implementations. A facility 302 comprises one or more physical structures or areas within which one or more items 108(1), 108(2), . . . , 108(Q) may be held. As used in this disclosure, letters in parenthesis such as "(Q)" indicate an integer value greater than or equal to zero. The items 108 may comprise physical goods, such as books, pharmaceuticals, repair parts, electronic gear, and so forth.

The facility 302 may include one or more areas designated for different functions with regard to inventory handling. In this illustration, the facility 302 includes a receiving area 304, a storage area 306, and a transition area 308.

The receiving area 304 may be configured to accept items 108, such as from suppliers, for intake into the facility 302. For example, the receiving area 304 may include a loading dock at which trucks or other freight conveyances unload the items 108. In some implementations, the items 108 may be processed, such as at the receiving area 304, to generate at least a portion of the item data 116. For example, an item 108 may be imaged or otherwise scanned to develop reference images or representations of the item 108 at the receiving area 304.

The storage area 306 is configured to store the items 108. The storage area 306 may be arranged in various physical configurations. In one implementation, the storage area 306 may include one or more aisles 310. The aisle 310 may be configured with, or defined by, fixtures 102 on one or both sides of the aisle 310. The fixtures 102 may include one or more of a shelf, a rack, a case, a cabinet, a bin, a floor location, or other suitable storage mechanisms for holding, supporting, or storing the items 108. For example, the fixtures 102 may comprise shelves with partitioned areas 106 designated therein. The fixtures 102 may be affixed to the floor or another portion of the structure of the facility 302. The fixtures 102 may also be movable such that the arrangements of aisles 310 may be reconfigurable. In some implementations, the fixtures 102 may be configured to move independently of an outside operator. For example, the fixtures 102 may comprise a rack with a power source and a motor, operable by a computing device to allow the rack to move from one location within the facility 302 to another.

One or more users 110(1), 110(2), . . . , 110(U) and totes 312(1), 312(2), . . . , 312(T) or other material handling apparatus may move within the facility 302. For example, the user 110 may move about within the facility 302 to pick or place the items 108 in various fixtures 102, placing them on the tote 312 for ease of transport. The tote 312 is configured to carry or otherwise transport one or more items 108. For example, the tote 312 may include a basket, cart, bag, bin, and so forth. In other implementations, other material handling apparatuses such as robots, forklifts, cranes, aerial drones, and so forth, may move about the facility 302 picking, placing, or otherwise moving the items 108. For example, a robot may pick an item 108 from a first fixture 102(1) and move the item 108 to a second fixture 102(2).

One or more sensors 124 may be configured to acquire information in the facility 302. The sensors 124 may include, but are not limited to, camera 124(1), depth sensors 124(2), load cells 104, optical sensor arrays 124(13), proximity sensors 124(6), and so forth. The sensors 124 may be stationary or mobile, relative to the facility 302. For example, the fixtures 102 may contain load cells 104 to generate weight signals, cameras 124(1) to acquire images of picking or placement of items 108 on shelves, optical sensor arrays 124(13) to detect shadows of the user's 110 hands at the fixtures 102, and so forth. In another example, the facility 302 may include a camera 124(1) to obtain images of the user 110 or other objects in the facility 302. The sensors 124 are discussed in more detail below with regard to FIG. 4.

While the storage area 306 is depicted as having one or more aisles 310, fixtures 102 storing the items 108, sensors 124, and so forth, it is understood that the receiving area 304, the transition area 308, or other areas of the facility 302 may be similarly equipped. Furthermore, the arrangement of the various areas within the facility 302 is depicted functionally rather than schematically. For example, in some implementations, multiple different receiving areas 304, storage areas 306, and transition areas 308 may be interspersed rather than segregated in the facility 302.

The facility 302 may include, or be coupled to, an inventory management system 112. The inventory management system 112 is configured to interact with users 110 or devices such as sensors 124, robots, material handling equipment, computing devices, and so forth, in one or more of the receiving area 304, the storage area 306, or the transition area 308.

During operation of the facility 302, the sensors 124 may be configured to provide sensor data, or information based on the sensor data, to the inventory management system 112. The sensor data may include image data, non-image data, weight data 114 obtained from load cells 104, and so forth. The sensors 124 are described in more detail below with regard to FIG. 4.

The inventory management system 112 or other systems may use the sensor data to track the location of objects within the facility 302, movement of the objects, or provide other functionality. Objects may include, but are not limited to, items 108, users 110, totes 312, and so forth. For example, a series of images acquired by the camera 124(1) may indicate removal by the user 110 of an item 108 from a particular location on the fixture 102 and placement of the item 108 on or at least partially within the tote 312.

The facility 302 may be configured to receive different kinds of items 108 from various suppliers and to store them until a customer orders or retrieves one or more of the items 108. A general flow of items 108 through the facility 302 is indicated by the arrows of FIG. 3. Specifically, as illustrated in this example, items 108 may be received from one or more suppliers, such as manufacturers, distributors, wholesalers, and so forth, at the receiving area 304. In various implementations, the items 108 may include merchandise, commodities, perishables, or any suitable type of item 108, depending on the nature of the enterprise that operates the facility 302.

Upon being received from a supplier at the receiving area 304, the items 108 may be prepared for storage in the storage area 306. For example, in some implementations, items 108 may be unpacked or otherwise rearranged. The inventory management system 112 may include one or more software applications executing on a computer system to provide inventory management functions. These inventory management functions may include maintaining information indicative of the type, quantity, condition, cost, location, weight, or any other suitable parameters with respect to the items 108. The items 108 may be stocked, managed, or dispensed in terms of countable units, individual units, or multiple units, such as packages, cartons, crates, pallets, or other suitable aggregations. Alternatively, some items 108, such as bulk products, commodities, and so forth, may be stored in continuous or arbitrarily divisible amounts that may not be inherently organized into countable units. Such items 108 may be managed in terms of a measurable quantity such as units of length, area, volume, weight, time, duration, or other dimensional properties characterized by units of measurement. Generally speaking, a quantity of an item 108 may refer to either a countable number of individual or aggregate units of an item 108 or a measurable amount of an item 108, as appropriate.

After arriving through the receiving area 304, items 108 may be stored within the storage area 306. In some implementations, like items 108 may be stored or displayed together in the fixtures 102 such as in bins, on shelves, hanging from pegboards, and so forth. In this implementation, all items 108 of a given kind are stored in one fixture 102. In other implementations, like items 108 may be stored in different fixtures 102. For example, to optimize retrieval of certain items 108 having frequent turnover within a large physical facility 302, those items 108 may be stored in several different fixtures 102 to reduce congestion that might occur at a single fixture 102.

When a customer order specifying one or more items 108 is received, or as a user 110 progresses through the facility 302, the corresponding items 108 may be selected or "picked" from the fixtures 102 containing those items 108. In various implementations, item picking may range from manual to completely automated picking. For example, in one implementation, a user 110 may have a list of items 108 they desire and may progress through the facility 302 picking items 108 from fixtures 102 within the storage area 306 and placing those items 108 into a tote 312. In other implementations, employees of the facility 302 may pick items 108 using written or electronic pick lists derived from customer orders. These picked items 108 may be placed into the tote 312 as the employee progresses through the facility 302.

After items 108 have been picked, the items 108 may be processed at a transition area 308. The transition area 308 may be any designated area within the facility 302 where items 108 are transitioned from one location to another or from one entity to another. For example, the transition area 308 may be a packing station within the facility 302. When the item 108 arrives at the transition area 308, the items 108 may be transitioned from the storage area 306 to the packing station. Information about the transition may be maintained by the inventory management system 112.

In another example, if the items 108 are departing the facility 302, a list of the items 108 may be obtained and used by the inventory management system 112 to transition responsibility for, or custody of, the items 108 from the facility 302 to another entity. For example, a carrier may accept the items 108 for transport with that carrier accepting responsibility for the items 108 indicated in the list. In another example, a user 110 may purchase or rent the items 108 and remove the items 108 from the facility 302. During use of the facility 302, the user 110 may move about the facility 302 to perform various tasks, such as picking or placing the items 108 in the fixtures 102.

To facilitate operation of the facility 302, the inventory management system 112 is configured to use the sensor data including the weight data 114 and other information such as the item data 116, the physical layout data 118, the non-weight data, and so forth, to generate interaction data 122.

The interaction data 122 may provide information about an interaction, such as a pick of an item 108 from the fixture 102, a place of an item 108 to the fixture 102, a touch made to an item 108 at the fixture 102, a gesture associated with an item 108 at the fixture 102, and so forth. The interaction data 122 may include one or more of the type of interaction, interaction location identifier indicative of where from the fixture 102 the interaction took place, item identifier, quantity change to the item 108, user identifier, and so forth. The interaction data 122 may then be used to further update the item data 116. For example, the quantity of items 108 on hand at a particular partitioned area 106 on the fixture 102 may be changed based on an interaction that picks or places one or more items 108.

The inventory management system 112 may combine or otherwise utilize data from different sensors 124 of different types, including the load cells 104. For example, weight data 114 obtained from load cells 104 at the fixture 102 may be used in conjunction with non-weight data such as the image data to determine the interaction data 122.

As described above, the inventory management system 112 may generate, utilize, or otherwise access the fault data 126, repair dispatch data 130, and so forth.

Figure 4:
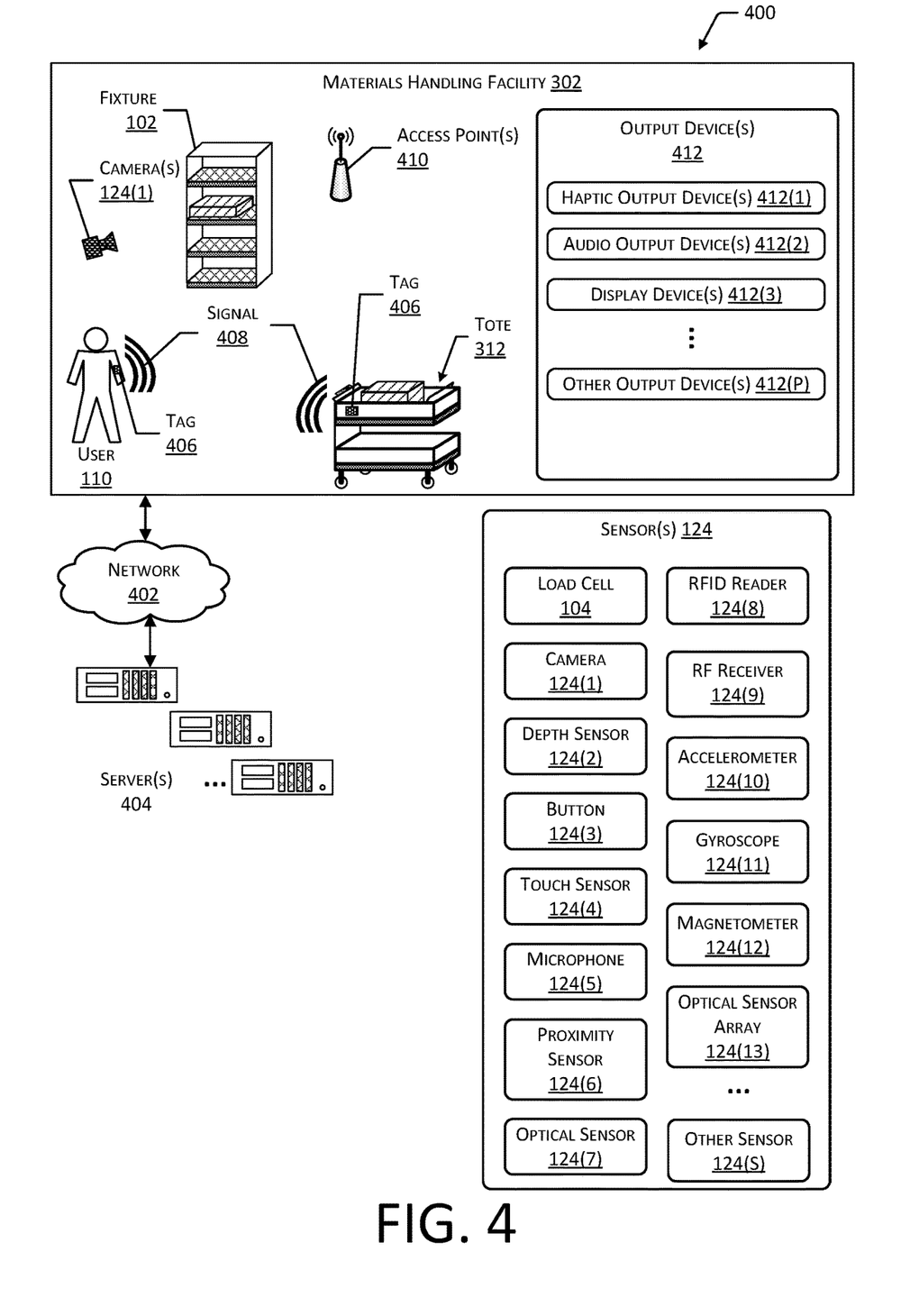
FIG. 4 is a block diagram illustrating additional details of the facility, according to some implementations.

FIG. 4 is a block diagram 400 illustrating additional details of the facility 302, according to some implementations. The facility 302 may be connected to one or more networks 402, which in turn connect to one or more servers 404. The network 402 may include private networks such as an institutional or personal intranet, public networks such as the Internet, or a combination thereof. The network 402 may utilize wired technologies (e.g., wires, fiber optic cables, and so forth), wireless technologies (e.g., radio frequency, infrared, acoustic, optical, and so forth), or other connection technologies. The network 402 is representative of any type of communication network, including one or more of data networks or voice networks. The network 402 may be implemented using wired infrastructure (e.g., copper cable, fiber optic cable, and so forth), wireless infrastructure (e.g., cellular, microwave, satellite, and so forth), or other connection technologies.

The servers 404 may be configured to execute one or more modules or software applications associated with the inventory management system 112 or other systems. While the servers 404 are illustrated as being in a location outside of the facility 302, in other implementations, at least a portion of the servers 404 may be located at the facility 302. The servers 404 are discussed in more detail below with regard to FIG. 5.

The users 110, the totes 312, or other objects in the facility 302 may be equipped with one or more tags 406. The tags 406 may be configured to emit a signal 408. In one implementation, the tag 406 may be a radio frequency identification (RFID) tag 406 configured to emit a RF signal 408 upon activation by an external signal. For example, the external signal may comprise a radio frequency signal or a magnetic field configured to energize or activate the RFID tag 406. In another implementation, the tag 406 may comprise a transmitter and a power source configured to power the transmitter. For example, the tag 406 may comprise a Bluetooth Low Energy (BLE) transmitter and battery. In other implementations, the tag 406 may use other techniques to indicate presence of the tag 406. For example, an acoustic tag 406 may be configured to generate an ultrasonic signal 408, which is detected by corresponding acoustic receivers. In yet another implementation, the tag 406 may be configured to emit an optical signal 408.

The inventory management system 112 may be configured to use the tags 406 for one or more of identification of the object, determining a location of the object, and so forth. For example, the users 110 may wear tags 406, the totes 312 may have tags 406 affixed, and so forth, which may be read and, based at least in part on signal strength, used to determine identity and location.

Generally, the inventory management system 112 or other systems associated with the facility 302 may include any number and combination of input components, output components, and servers 404.

The one or more sensors 124 (including the load cells 104) may be arranged at one or more locations within the facility 302. For example, the sensors 124 may be mounted on or within a floor, wall, at a ceiling, at a fixture 102, on a tote 312, may be carried or worn by a user 110, and so forth.

The sensors 124 may include one or more load cells 104. One or more load cells 104 are configured to measure the weight of a load, such as the item 108, the tote 312, or other objects. The load cells 104 may be configured to measure the weight of the load at one or more of the fixtures 102, the tote 312, on the floor of the facility 302, and so forth. For example, the fixture 102 may include a plurality of partitioned areas 106 or platforms, with one or more load cells 104 beneath each partitioned area 106 to provide weight signals about an individual partitioned area 106 or platform. The load cells 104 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of load cells 104 may operate as transducers that generate one or more signals based on an applied force, such as that of the load due to gravity. For example, the load cell 104 may comprise a strain gauge and a structural member that deforms slightly when weight is applied. By measuring a change in the electrical characteristic of the strain gauge, such as capacitance or resistance, the weight may be determined. In another example, the load cell 104 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 112 may use the data acquired by the load cells 104 to identify an object, determine a change in the quantity of objects, determine a location of an object, maintain shipping records, and so forth.

The sensors 124 may include one or more cameras 124(1) or other imaging sensors. The one or more cameras 124(1) may include imaging sensors configured to acquire images of a scene. The cameras 124(1) are configured to detect light in one or more wavelengths including, but not limited to, terahertz, infrared, visible, ultraviolet, and so forth. The one or more cameras 124(1) may comprise charge coupled devices (CCD), complementary metal oxide semiconductor (CMOS) devices, microbolometers, and so forth. The inventory management system 112 may use image data acquired by the one or more cameras 124(1) during operation of the facility 302. For example, the inventory management system 112 may identify items 108, users 110, totes 312, and so forth, based at least in part on their appearance within the image data acquired by the one or more cameras 124(1). The one or more cameras 124(1) may be mounted in various locations within the facility 302. For example, a camera 124(1) may be mounted overhead, on fixtures 102, may be worn or carried by users 110, may be affixed to totes 312, and so forth.

One or more depth sensors 124(2) may also be included in the sensors 124. The depth sensors 124(2) are configured to acquire spatial or three-dimensional (3D) data, such as depth information, about objects within a field of view. The depth sensors 124(2) may include range cameras, lidar systems, sonar systems, radar systems, structured light systems, stereo vision systems, optical interferometry systems, and so forth. The inventory management system 112 may use the 3D data acquired by the depth sensors 124(2) to identify objects, determine a location of an object in 3D real space, and so forth.

One or more buttons 124(3) may be configured to accept input from the user 110. The buttons 124(3) may comprise mechanical, capacitive, optical, or other mechanisms. For example, the buttons 124(3) may comprise mechanical switches configured to accept an applied force from a touch of the user 110 to generate an input signal. The inventory management system 112 may use data from the buttons 124(3) to receive information from the user 110. For example, the tote 312 may be configured with a button 124(3) to accept input from the user 110 and send information indicative of the input to the inventory management system 112.

The sensors 124 may include one or more touch sensors 124(4). The touch sensors 124(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 112 may use data from the touch sensors 124(4) to receive information from the user 110. For example, the touch sensor 124(4) may be integrated with the tote 312 to provide a touchscreen with which the user 110 may select from a menu one or more particular items 108 for picking, enter a manual count of items 108 at a fixture 102, and so forth.

One or more microphones 124(5) may be configured to acquire information indicative of sound present in the environment. In some implementations, arrays of microphones 124(5) may be used. These arrays may implement beamforming techniques to provide for directionality of gain. The inventory management system 112 may use the one or more microphones 124(5) to acquire information from acoustic tags 406, accept voice input from the users 110, determine ambient noise level, and so forth.

The sensors 124 may include proximity sensors 124(6) used to determine presence of an object, such as the user 110, the tote 312, and so forth. The proximity sensors 124(6) may use optical, electrical, ultrasonic, electromagnetic, or other techniques to determine a presence of an object. In some implementations, the proximity sensors 124(6) may use an optical emitter and an optical detector to determine proximity. For example, an optical emitter may emit light, a portion of which may then be reflected by the object back to the optical detector to provide an indication that the object is proximate to the proximity sensor 124(6). In other implementations, the proximity sensors 124(6) may comprise a capacitive proximity sensor 124(6) configured to provide an electrical field and determine a change in electrical capacitance due to presence or absence of an object within the electrical field.

The proximity sensors 124(6) may be configured to provide sensor data indicative of one or more of a presence or absence of an object, a distance to the object, or characteristics of the object. An optical proximity sensor 124(6) may use time-of-flight (ToF), structured light, interferometry, or other techniques to generate the distance data. For example, ToF determines a propagation time (or "roundtrip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 124 such as a camera 124(1). Based on an apparent distance between the features of the structured light pattern, the distance to the object may be calculated. Other techniques may also be used to determine distance to the object. In another example, the color of the reflected light may be used to characterize the object, such as skin, clothing, tote 312, and so forth.

The sensors 124 may include one or more optical sensors 124(7). The optical sensors 124(7) may be configured to provide data indicative of one or more of color or intensity of light impinging thereupon. For example, the optical sensor 124(7) may comprise a photodiode and associated circuitry configured to generate a signal or data indicative of an incident flux of photons. As described below, the optical sensor array 124(13) may comprise a plurality of the optical sensors 124(7). For example, the optical sensor array 124(13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 124(7) may be used. The optical sensors 124(7) may be sensitive to one or more of infrared light, visible light, or ultraviolet light. For example, the optical sensors 124(7) may be sensitive to infrared light, and infrared light sources such as LEDs may provide illumination.

The optical sensors 124(7) may include photodiodes, photoresistors, photovoltaic cells, quantum dot photoconductors, bolometers, pyroelectric infrared detectors, and so forth. For example, the optical sensor 124(7) may use germanium photodiodes to detect infrared light.

One or more radio frequency identification (RFID) readers 124(8), near field communication (NFC) systems, and so forth, may be included as sensors 124. For example, the RFID readers 124(8) may be configured to read the RF tags 406. Information acquired by the RFID reader 124(8) may be used by the inventory management system 112 to identify an object associated with the RF tag 406 such as the item 108, the user 110, the tote 312, and so forth. For example, based on information from the RFID readers 124(8) detecting the RF tag 406 at different times and RFID readers 124(8) having different locations in the facility 302, a velocity of the RF tag 406 may be determined.

One or more RF receivers 124(9) may also be included as sensors 124. In some implementations, the RF receivers 124(9) may be part of transceiver assemblies. The RF receivers 124(9) may be configured to acquire RF signals 408 associated with Wi-Fi, Bluetooth, ZigBee, 2G, 3G, 4G, LTE, or other wireless data transmission technologies. In some implementations, the RF receivers 124(9) may detect signals transmitted at frequencies such as below 15 MHz. The RF receivers 124(9) may provide information associated with data transmitted via radio frequencies, signal strength of RF signals 408, and so forth. For example, information from the RF receivers 124(9) may be used by the inventory management system 112 to determine a location of an RF source, such as a communication interface onboard the tote 312.

The sensors 124 may include one or more accelerometers 124(10), which may be worn or carried by the user 110, mounted to the tote 312, and so forth. The accelerometers 124(10) may provide information such as the direction and magnitude of an imposed acceleration. Data such as rate of acceleration, determination of changes in direction, speed, and so forth, may be determined using the accelerometers 124(10).

A gyroscope 124(11) may provide information indicative of rotation of an object affixed thereto. For example, the tote 312 or other objects may be equipped with a gyroscope 124(11) to provide data indicative of a change in orientation of the object.

A magnetometer 124(12) may be used to determine an orientation by measuring ambient magnetic fields, such as the terrestrial magnetic field. The magnetometer 124(12) may be worn or carried by the user 110, mounted to the tote 312, and so forth. For example, the magnetometer 124(12) mounted to the tote 312 may act as a compass and provide information indicative of which direction the tote 312 is oriented.

An optical sensor array 124(13) may comprise one or optical sensors 124(7). The optical sensors 124(7) may be arranged in a regular, repeating, or periodic two-dimensional arrangement such as a grid. The optical sensor array 124(13) may generate image data. For example, the optical sensor array 124(13) may be arranged within or below a fixture 102 and obtain information about shadows of items 108, hand of the user 110, and so forth.

The sensors 124 may include other sensors 124(S) as well. For example, the other sensors 124(S) may include light curtains, ultrasonic rangefinders, thermometers, barometric sensors, hygrometers, and so forth. For example, the inventory management system 112 may use information acquired from thermometers and hygrometers in the facility 302 to direct the user 110 to check on delicate items 108 stored in a particular fixture 102, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the fixture 102, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 110 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 110 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 110 may be used to trigger acquisition or selection of image data for processing by the analysis module 120.

The other sensors 124(S) may also include an instrumented auto-facing unit (AFU). The instrumented AFU may comprise a position sensor configured to provide data indicative of displacement of a pusher. As an item 108 is removed from the instrumented AFU, the pusher moves, such as under the influence of a spring, and pushes the remaining items 108 in the instrumented AFU to the front of the fixture 102. By using data from the position sensor, and given item data 116 such as a depth of an individual item 108, a count may be determined, based on a change in position data. For example, if each item 108 is 1 inch deep, and the position data indicates a change of 4 inches, the quantity held by the instrumented AFU may have changed by 4 items 108. This count information may be used to confirm or provide a cross check for a count obtained by other means, such as analysis of the image data.

In some implementations, the camera 124(1) or other sensors 124(S) may include hardware processors, memory, and other elements configured to perform various functions. For example, the camera 124(1) may be configured to generate image data, send the image data to another device such as the server 404, and so forth.

The facility 302 may include one or more access points 410 configured to establish one or more wireless networks. The access points 410 may use Wi-Fi, NFC, Bluetooth, or other technologies to establish wireless communications between a device and the network 402. The wireless networks allow the devices to communicate with one or more of the sensors 124, the inventory management system 112, the optical sensor arrays 124(13), the tags 406, a communication device of the tote 312, or other devices.

Output devices 412 may also be provided in the facility 302. The output devices 412 are configured to generate signals, which may be perceived by the user 110 or detected by the sensors 124. In some implementations, the output devices 412 may be used to provide illumination of the optical sensor array 124(13).

Haptic output devices 412(1) are configured to provide a signal that results in a tactile sensation to the user 110. The haptic output devices 412(1) may use one or more mechanisms such as electrical stimulation or mechanical displacement to provide the signal. For example, the haptic output devices 412(1) may be configured to generate a modulated electrical signal, which produces an apparent tactile sensation in one or more fingers of the user 110. In another example, the haptic output devices 412(1) may comprise piezoelectric or rotary motor devices configured to provide a vibration, which may be felt by the user 110.

One or more audio output devices 412(2) may be configured to provide acoustic output. The acoustic output includes one or more of infrasonic sound, audible sound, or ultrasonic sound. The audio output devices 412(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 412(3) may be configured to provide output, which may be seen by the user 110 or detected by a light-sensitive sensor such as a camera 124(1) or an optical sensor 124(7). In some implementations, the display devices 412(3) may be configured to produce output in one or more of infrared, visible, or ultraviolet light. The output may be monochrome or in color. The display devices 412(3) may be one or more of emissive, reflective, microelectromechanical, and so forth. An emissive display device 412(3), such as using LEDs, is configured to emit light during operation. In comparison, a reflective display device 412(3), such as using an electrophoretic element, relies on ambient light to present an image. Backlights or front lights may be used to illuminate non-emissive display devices 412(3) to provide visibility of the output in conditions where the ambient light levels are low.

The display devices 412(3) may be located at various points within the facility 302. For example, the addressable displays may be located on fixtures 102, totes 312, on the floor of the facility 302, and so forth.

Other output devices 412(P) may also be present. For example, the other output devices 412(P) may include scent/odor dispensers, document printers, 3D printers or fabrication equipment, and so forth.

Figure 5:
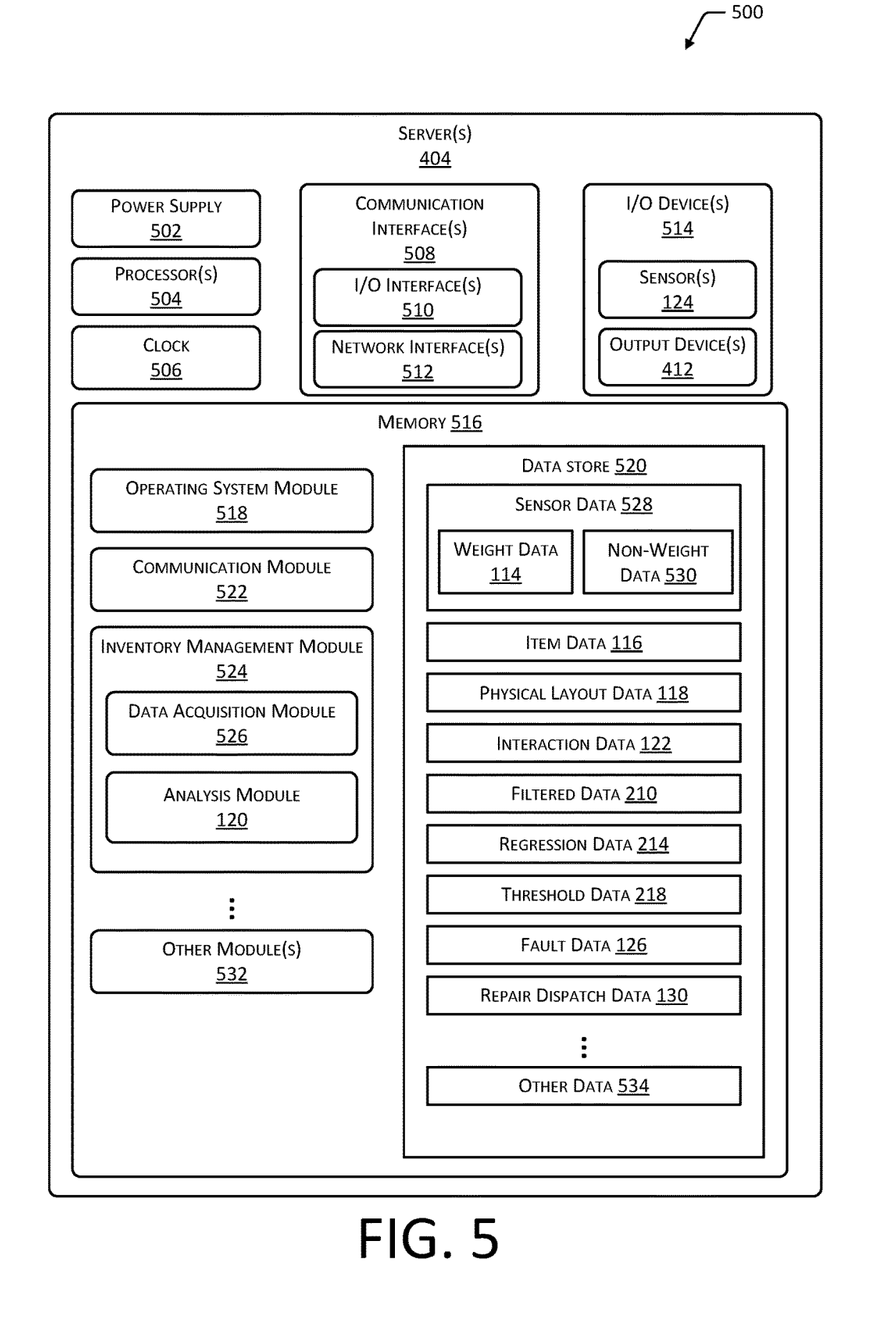
FIG. 5 is a block diagram of a server to support operation of the facility, according to some implementations.

FIG. 5 illustrates a block diagram 500 of a server 404 configured to support operation of the facility 302, according to some implementations. The server 404 may be physically present at the facility 302, may be accessible by the network 402, or a combination of both. The server 404 does not require end-user knowledge of the physical location and configuration of the system that delivers the services. Common expressions associated with the server 404 may include "on-demand computing", "software as a service (SaaS)", "platform computing", "network-accessible platform", "cloud services", "data centers", and so forth. Services provided by the server 404 may be distributed across one or more physical or virtual devices.

One or more power supplies 502 may be configured to provide electrical power suitable for operating the components in the server 404. The one or more power supplies 502 may comprise batteries, capacitors, fuel cells, photovoltaic cells, wireless power receivers, conductive couplings suitable for attachment to an external power source such as provided by an electric utility, and so forth. The server 404 may include one or more hardware processors 504 (processors) configured to execute one or more stored instructions. The processors 504 may comprise one or more cores. One or more clocks 506 may provide information indicative of date, time, ticks, and so forth. For example, the processor 504 may use data from the clock 506 to associate a particular interaction with a particular point in time.

The server 404 may include one or more communication interfaces 508 such as input/output (I/O) interfaces 510, network interfaces 512, and so forth. The communication interfaces 508 enable the server 404, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include input devices such as one or more of a sensor 124, keyboard, mouse, scanner, and so forth. The I/O devices 514 may also include output devices 412 such as one or more of a display device 412(3), printer, audio speakers, and so forth. In some embodiments, the I/O devices 514 may be physically incorporated with the server 404 or may be externally placed.

The network interfaces 512 may be configured to provide communications between the server 404 and other devices, such as the totes 312, routers, access points 410, and so forth. The network interfaces 512 may include devices configured to couple to personal area networks (PANs), local area networks (LANs), wireless local area networks (WLANS), wide area networks (WANs), and so forth. For example, the network interfaces 512 may include devices compatible with Ethernet, Wi-Fi, Bluetooth, ZigBee, and so forth.

The server 404 may also include one or more busses or other internal communications hardware or software that allow for the transfer of data between the various modules and components of the server 404.

As shown in FIG. 5, the server 404 includes one or more memories 516. The memory 516 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 516 provides storage of computer-readable instructions, data structures, program modules, and other data for the operation of the server 404. A few example functional modules are shown stored in the memory 516, although the same functionality may alternatively be implemented in hardware, firmware, or as a system on a chip (SoC).

The memory 516 may include at least one operating system (OS) module 518. The OS module 518 is configured to manage hardware resource devices such as the I/O interfaces 510, the I/O devices 514, the communication interfaces 508, and provide various services to applications or modules executing on the processors 504. The OS module 518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 516 may be a data store 520 and one or more of the following modules. These modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including the servers 404, network attached storage devices, and so forth.

A communication module 522 may be configured to establish communications with one or more of the totes 312, sensors 124, display devices 412(3), other servers 404, or other devices. The communications may be authenticated, encrypted, and so forth.

The memory 516 may store an inventory management module 524. The inventory management module 524 is configured to provide the inventory functions as described herein with regard to the inventory management system 112. For example, the inventory management module 524 may track items 108 between different fixtures 102, to and from the totes 312, and so forth. The inventory management module 524 may access sensor data 528. The sensor data 528 may include the weight data 114, non-weight data 530, such as obtained from other sensors 124 such as cameras 124(1), depth sensors 124(2), and so forth.

The data store 520 may store other data such as the filtered data 210, regression data 214, threshold data 218, fault data 126, repair dispatch data 130, and so forth.

The inventory management module 524 may include one or more of a data acquisition module 526 and the analysis module 120. The data acquisition module 526 may be configured to acquire and access information associated with operation of the facility 302. For example, the data acquisition module 526 may be configured to acquire sensor data 528, such as the weight data 114, the non-weight data 530 such as the image data, and so forth.

The analysis module 120 may operate as described above, and is configured to generate interaction data 122 and fault data 126. The analysis module 120 may process other non-weight data 530, such as the image data.

Processing of image data may be performed by an image processing module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 528 or other data. For example, the ANN may be a trained using a supervised learning algorithm such that object identifiers are associated with images of particular objects within training images provided to the ANN. Once trained, the ANN may be provided with the sensor data 528 to determination of similarity between two or more images, provide object identification, and so forth.

Other modules 532 may also be present in the memory 516 as well as other data 534 in the data store 520. For example, the other modules 532 may include an accounting module while the other data 534 may include billing data. The accounting module may be configured to assess charges to accounts associated with particular users 110 or other entities, while the billing data may include information such as payment account numbers.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    accessing first weight data obtained by a first subset of load cells of a fixture;
    accessing second weight data obtained by a second subset of load cells of the fixture, wherein the second subset of load cells is mutually exclusive of the first subset of load cells;
    comparing the first weight data and the second weight data using at least a linear regression;
    determining a failure of the first subset of load cells of the fixture based on the comparing;
    generating one or more hypotheses for describing an interaction at the fixture based on the second weight data;
    selecting one hypothesis from the one or more hypotheses to describe the interaction at the fixture, wherein the interaction comprises one or more of picking an item from the fixture or placing the item at the fixture; and
    updating an inventory quantity of the item based on the one hypothesis that is selected.

2. The method of claim 1, the comparing the first weight data and the second weight data using the at least the linear regression further comprising:
    generating regression data using the second weight data;
    determining a best fit value using the regression data;
    determining error data based on the best fit value and the first weight data;
    comparing the error data to a threshold value; and
    wherein the determining the failure of the first subset of load cells is further based on the error data being greater than the threshold value.

3. The method of claim 2, further comprising:
    determining an absolute value of a difference between the best fit value and the first weight data;
    determining a first value by dividing a largest absolute value of a plurality of best fit values by two; and
    determining an error value by subtracting the first value from the absolute value of the difference.

4. The method of claim 1, further comprising:
    accessing item data regarding one or more types of items stowed at the fixture; and
    wherein the item data is used to generate the one or more hypotheses.

5. The method of claim 1, further comprising:
    detecting a change in weight at the fixture;
    determining occurrence of an event at the fixture, based on the change in weight at the fixture; and
    wherein the first weight data and the second weight data are obtained during the event.

6. The method of claim 1, further comprising:
    generating filtered weight data by applying a filter to the first weight data and the second weight data.

7. The method of claim 1, further comprising:
    generating fault data indicative of the failure of the first subset of load cells; and
    performing one or more mitigation actions responsive to the failure of the first subset of load cells, the one or more mitigation actions comprising one or more of:
        disregarding the first weight data from the first subset of load cells,
        deactivating the first subset of load cells, or
        generating a notification to repair or replace the first subset of load cells.

8. A system comprising:
a shelf;
a plurality of load cells configured to acquire weight data associated with the shelf; and
a computing device comprising:
  a memory storing first computer-executable instructions; and
  a hardware processor to execute the first computer-executable instructions to:
    acquire first weight data from a first subset of the plurality of load cells;
    acquire second weight data from a second subset of the plurality of load cells;
    compare the first weight data and the second weight data using at least a linear regression;
    determine a failure of the first subset of the plurality of load cells based on the comparison of the first weight data and the second weight data;
    generate one or more hypotheses for describing an interaction at the shelf using the second weight data; and
    initiate one or more mitigation actions responsive to the failure of the first subset of the plurality of load cells, the one or more mitigation actions comprising one or more of:
      disregarding the first weight data from the first subset of the plurality of load cells,
      deactivating the first subset of the plurality of load cells, or
      generating a notification associated with the failure of the first subset of the plurality of load cells.

9. The system of claim 8, the hardware processor to further execute the first computer-executable instructions to:
  generate fit data indicative of a least squares fit using the second weight data;
  determine one or more predicted values of the first weight data based on the fit data;
  determine one or more differences between one or more actual values of the first weight data and the one or more predicted values of the first weight data; and
  wherein an error value is based on the one or more differences.

10. The system of claim 8, wherein:
the shelf is rectangular in shape; and
each load cell of the plurality of load cells is arranged proximate to an edge or a corner of the shelf.

11. The system of claim 8, the hardware processor to further execute the first computer-executable instructions to:
  generate filtered weight data by applying a Gaussian filter to the weight data acquired by the plurality of load cells.

12. The system of claim 8, the hardware processor to further execute the first computer-executable instructions to:
  determine a change in weight data at the shelf using a CUSUM function;
  determine an event occurring at the shelf, based on the change in weight data at the shelf; and
  wherein the first weight data and the second weight data are acquired during the event.

13. The system of claim 8, the hardware processor to further execute the first computer-executable instructions to:
  generate fault data indicative of the failure of the first subset of the plurality of load cells.

14. The system of claim 8, the hardware processor to further execute the first computer-executable instructions to:
  access item data regarding one or more types of items stowed at the shelf;
  access physical layout data comprising information indicative of a location of the shelf and a placement of the load cells on the shelf; and
  wherein the item data and the physical layout data are further used to generate the one or more hypotheses.

15. A system comprising:
a memory storing first computer-executable instructions; and
a hardware processor to execute the first computer-executable instructions to:
  determine occurrence of an event at a fixture;
  acquire first weight data from a first subset of load cells at the fixture;
  acquire second weight data from a second subset of load cells at the fixture;
  compare the first weight data and the second weight data using at least a linear regression;
  determine a fault in the first subset of load cells based on the comparison of the first weight data and the second weight data;
  generate one or more hypotheses for describing an interaction at the fixture based on the second weight data; and
  disregard the first weight data based on the fault in the first subset of load cells.

16. The system of claim 15, wherein the first computer-executable instructions to determine the occurrence of the event at the fixture further comprise instructions to:
  detect a change in weight data at the fixture based on a CUSUM function.

17. The system of claim 15, further comprising:
the fixture;
the load cells in the first subset;
the load cells in the second subset; and
wherein the load cells in the first subset and the load cells in the second subset are mutually exclusive and arranged in different locations with respect to the fixture.

18. The system of claim 15, the hardware processor to further execute the first computer-executable instructions to:
  initiate one or more mitigation actions in response to the fault in the first subset of load cells, the one or more mitigation actions comprising one or more of:
    deactivating the first subset of load cells, or
    generating a notification to repair or replace the first subset of load cells.

19. The system of claim 15, wherein the first computer-executable instructions to determine the occurrence of the event further comprise instructions to:
  generate filtered data by applying a filter to the first weight data and the second weight data; and
  perform a ridge regression on the filtered data.

20. The system of claim 15, wherein the first computer-executable instructions to compare the first weight data and the second weight data using the at least the linear regression further comprise instructions to:
  generate regression data using the second weight data;
  determine a best fit value using the regression data;
  determine error data based on the best fit value and the first weight data;
  compare the error data to a threshold value; and
  wherein the determination of the fault in the first subset of load cells is based on the error data being greater than the threshold value.

* * * * *